Figure 1:
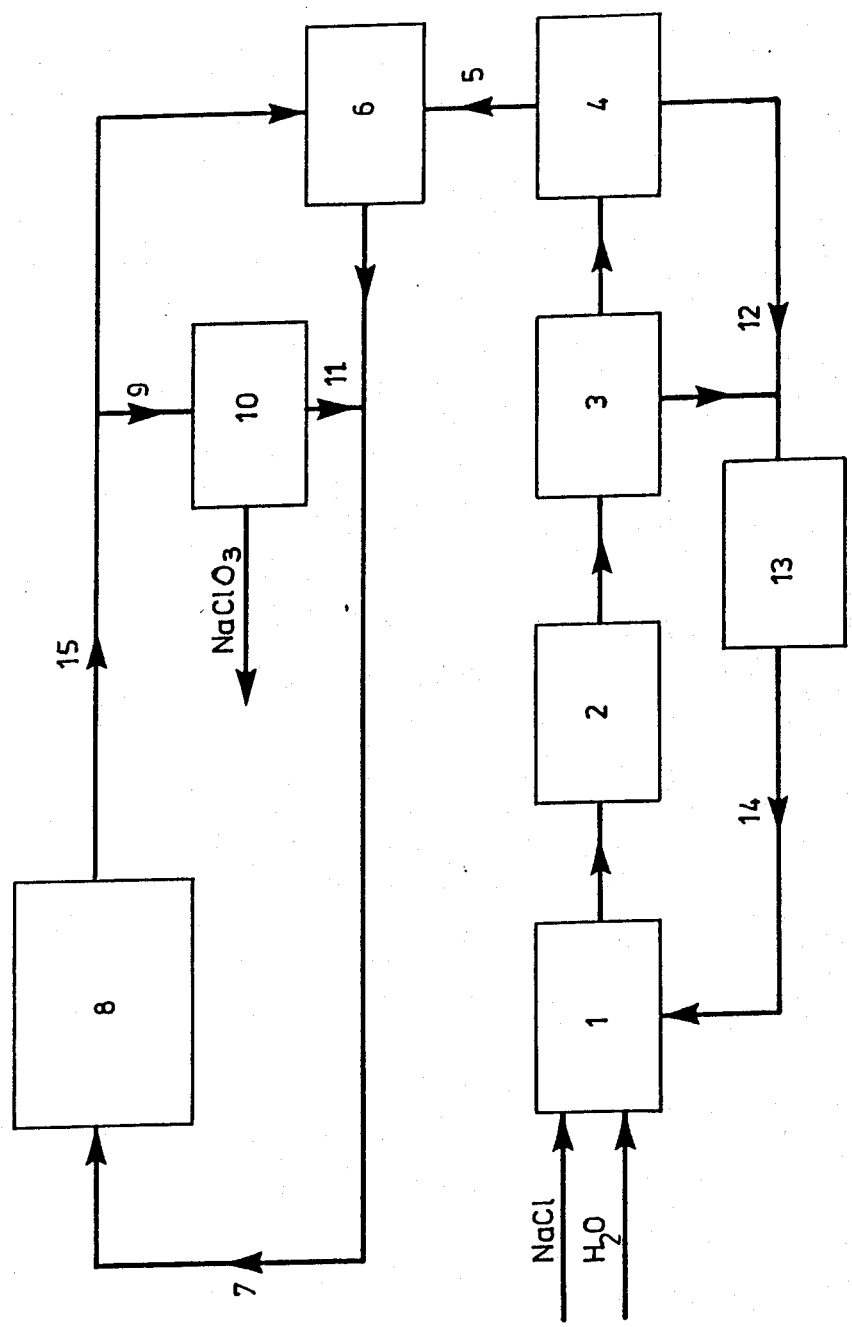

United States Patent [19]

Welander et al.

[11] Patent Number: 4,888,099

[45] Date of Patent: Dec. 19, 1989

[54] PROCESS FOR THE PRODUCTION OF ALKALI METAL CHLORATE

[75] Inventors: Bo C. Welander, Saltsjöbaden; Tommy C. K. Öhlin, Nyhamns Läge, both of Sweden; Ronald P. Jarvis, Lennoxville, Canada

[73] Assignee: Eka Nobel AB, Surte, Sweden

[21] Appl. No.: 10,726

[22] Filed: Feb. 4, 1987

[30] Foreign Application Priority Data

Feb. 10, 1986 [SE] Sweden .............................. 8600555

[51] Int. Cl.⁴ ................................................. C25B 1/26
[52] U.S. Cl. ......................................................... 204/95
[58] Field of Search ................................. 204/95, 98

[56] References Cited

U.S. PATENT DOCUMENTS

| | | | |
|---|---|---|---|
| 3,201,333 | 8/1965 | Sakowski | 204/99 |
| 3,407,128 | 10/1968 | Goerg | 204/95 |
| 3,835,001 | 9/1974 | O'Brien | 204/95 |
| 4,326,941 | 4/1982 | Westerlund | 204/269 |
| 4,405,418 | 9/1983 | Takemura | 204/95 |
| 4,636,376 | 1/1987 | Maloney et al. | 204/95 |

FOREIGN PATENT DOCUMENTS 1352034 12/1963 France.

*Primary Examiner*—T. Tung
*Attorney, Agent, or Firm*—Fred Philpitt

[57] ABSTRACT

The invention relates to a process for the production of alkali metal chlorates by electrolysis of alkali metal chloride. The electrolyte is prepared by addition of a crystal slurry having a dry content above 50 per cent by weight to the of alkali metal chloride depleted reaction solution flowing out from th eelectrolyster. The crystal slurry has been prepared by dissolving an alkali metal chloride in water whereafter the obtained water solution has been purified in a known manner and concentrated to the stated dry content.

13 Claims, 1 Drawing Sheet

PROCESS FOR THE PRODUCTION OF ALKALI METAL CHLORATE

The present invention relates to a process for the production of alkali metal chlorate by electrolysis of an electrolyte containing alkali metal chloride. The electrolyte is prepared by dissolving an alkali metal chloride in water and the obtained aqueous solution is then purified and concentrated to a dry content above 50 percent by weight. The thus obtained crystal slurry is then used as a source for alkali metal chloride at production of electrolyte.

Alkali metal chlorate, and particularly sodium chlorate, is a very important chemical in the cellulose industry, where it is used as a raw material for the production of chlorine dioxide. Chlorine dioxide is an important bleaching chemical for cellulose fibres.

At the production of sodium chlorate by electrolysis of sodium chloride one of the most important factors is the control of the water balance in the system. If the electrolyte contains too much water the yield at the electrolysis is impaired and the load on the crystallization system is increased. Although water is consumed in the reaction according to the net formula $$NaCl + 3H_2O \rightarrow NaClO_3 + 3H_2$$

this consumption of water is usually too small to balance the feed of water. Water is added through chemical additives and different wash waters in the process and, besides that, a great part of the water feed usually occurs through the sodium chloride which is added to the process in the form of a saturated sodium chloride solution. This can result in an imbalance in the amount of water and the water must be removed in some way.

All or part of the water can be removed in the crystallization system of the process. However, removal of too much water in this stage is disadvantageous. Firstly, greater flows of electrolyte to the crystallizer are required and this leads to a higher consumption of chemicals in the process. This is the case since the electrolyte flow to the crystallizer has to be treated, either by changing pH, which gives a specific caustic consumption, or wwith a chemical which reacts with the hypochlorite which is present, which gives consumption of some reducing agent such as hydrogen peroxide. Secondly, a larger crystallizer is required and this involves higher investment costs. Also other parts of the crystallizer system will have to have larger dimensions, eg condensors, pumps, reaction vessels and pipings. In those cases when cooling must be carried out using coolers substantial additional investments are required for this equipment. There are also other disadvantages connected with removal of large amounts of water in the crystallizer with accompanying larger flows. Among other things the possibility of having electrolytes of varying contents is influenced. Furthermore there is at the water removal a need of large amounts of heat in the form of steam or hot water which could have been used for other purposes. It is true that these amounts of heat are obtained as steam from the crystallizer but at such a low temperature level that they can hardly be used.

Another way of solving the water balance problems is to add sodium chloride in solid form to the electrolyte. In this way addition of a large part of the water feed is avoided but since the solid sodium chloride contains too much impurities too make it possible to operate the process appropriately in the long run this measure is not possible without further ado. There will be substantial sludge problems in different parts of the process, eg in the electrode gaps, and this in turn would give rise to considerable additional costs in the form of higher energy consumption.

In order to avoid these disadvantages the electrolyte must be purified before it is fed to the electrolyser. This purification is achieved partly by precipitation and separation by treating the saline solution with sodium carbonate, sodium hydroxide and similar compounds for precipitation of impurities in the form of calcium carbonate, magnesium hydroxide and similar compounds. However, the precipitation step results in a saline solution which can contain calcium and magnesium in concentrations of 3 to 20 mg per liter and 0.5 to 5 mg per liter respectively. To remove these amounts the electrolyte is usually also treated with chelating ion exchange resins. The concentration of calcium, magnesium and barium in the electrolyte can hereby be reduced to 0.1 mg per liter, or less. Ion exchange resins of sodium type can for example be used as chelating ion exchange resin. After completed absorption treatment the chelating ion exchange resin is treated with a mineral acid, such as hydrochloric acid, for desorption of the total amount of metal ions adsorbed on the resin. The resin is then regenerated by treatment with a sodium hydroxide solution. Purification methods of the type disclosed above are previously known and disclosed for example in U.S. Pat. No. 4405418, which is hereby incorporated by reference.

Very large amounts of electrolyte are handled in a chlorate plant since the alkali metal chloride solution is circulated through the electrolyzers and are re-introduced to the electrolyzer after making up for consumed sodium chloride. During the electrolysis formed chlorate is withdrawn from the plant by transferring part of the flow, usually about 10% of the electrolyte flowing out from the electrolyser, to a crystallizer. In the crystallizer sodium chlorate is obtained by cooling and evaporation of the liquid quantity. The mother liquor is recycled to the electrolyte. Due to this circulation of electrolyte, containing fairly high amounts of sodium chlorate, the system contains large amounts of water. This means that the above described process for upgrading freshly added sodium chloride must be dimensioned with regard to the flow through the plant. Further, the steps of purification must be adjusted with regard to the chemicals present in the electrolyte. There is a special disadvantage at the regeneration of the ion exchange resin since there is a risk that chlorine dioxide will be formed. This is due to the fact that chlorate from the electrolyte sticks to the ion exchange resin and reacts with hydrochloric acid, which is used at the regeneration, to form chlorine dioxide.

According to the present invention these problems are avoided by preparing the electrolyte in the manner disclosed in the appended claims.

By dissolving the alkali metal chloride in water and purifying the water solution in known manner, eg as disclosed in the above mentioned patent, only a limited amount of water has to be subjected to the purifying conditions. Another advantage is that the water phase in this water solution contains fewer chemicals which means that the process can be made more simple and less costly. In particular the risk of chlorine dioxide formation at regeneration of the ion exchange resin is avoided.

When carrying out the process according to the invention the solid alkali metal chloride is first completely dissolved in water and the saline solution is then purified in a known manner by addition of precipitating chemicals and preferably also by treatment with an ion exchange resin. This saline solution will thus be free from the most important impurities. In the next step the thus purified saline solution is brought to a salt evaporator, where water is evaporated at a fairly high temperature, and preferably under vacuum. The temperature rise is suitably achieved by means of waste heat in the form of hot water from the process or by means of hot electrolyte. The water solution is concentrated to a dry content or solids content above 50 percent by weight, suitably within the range of from 60 to 95 percent by weight, and preferably from 70 to 90 percent by weight. The concentration is suitably achieved by evaporation to a dry content of about 70%, and the remaining water is then removed mechanically, eg by sedimentation or separation by means of a screw. Any known technique for mechanical separation of water from the crystal slurry can be used. Remaining impurities, preferably in the form of sulphates, are enriched in the mother liquor phase from the salt concentration and can thereby be removed by withdrawing a side flow of mother liquor from the salt contration for continuous removal of sulphate in an external system. Since the sulphate is enriched in the mother liquor the sulphate can be removed in a simple manner by precipitation as barium or calcium sulphate. Optional excess of barium or calcium in the filtrate can be returned to the step for dissolving the alkali metal chloride and later be removed in the subsequent purification step.

Hereby addition of barium ions to the electrolyte for control of the sulphate balance is also avoided, which is absolutely necessary in known processes wherein the alkali metal chloride is dissolved directly in the electrolyte. This means that it is avoided that optionally precipitated barium sulphate can block active centers on the electrodes in the chlorate electrolyser.

The obtained crystal slurry is then added to the of alkali metal chloride depleted reaction solution which is withdrawn from the electrolyser before or after that alkali metal chlorate has been removed from this solution. According to a preferred embodiment the crystal slurry is added directly to the optionally cooled reaction solution flowing out from the electrolyser, before this has been brought to the crystallizer for alkali metal chlorate. This can be done either by adding the crystal slurry to the whole reaction solution or by adding it to that part of the reaction solution which is not brought to the crystallizer. This solution has the lowest alkali metal chloride content and thus a very good dissolution of the alkali metal chloride crystals in the reaction solution is obtained. The solution obtained in this manner can be fed directly to the electrolyser without demands on additional purification.

The electrolyte prepared according to the present invention can be used in any known technique for production of alkali metal chlorate. Sodium is preferred as the alkali metal but potassium chlorate can also be produced according to the present process. As an example of a suitable method can be mentioned a process wherein the electrolyser is equipped with a metal anode functioning at a current density of between 10 and 75 amperes per liter circulating electrolyte, preferably between 18 and 35 amperes per liter circulating electrolyte, in each voltage drop. As metal anode an electrode can be used which comprises a titanium substrate and a coating of at least one of the platinum group metals, or an oxide thereof, applied to the substrate. As cathode an electrode can be used which has been prepared from iron, stainless steel or titanium or comprising such a metal and a platinum group metal. The type of electrolyser can be either a unipolar or a bipolar cell.

The electrolyte can be composed of between 30 and 700 grams per liter of sodium chlorate and between 50 and 300 grams per liter of sodium chloride. The pH of the electrolyte is between 5 and 8, but has preferably a value of from 5.8 to 6.5. The temperature of the electrolyte should be within the range of from 60° to 90° C. and the current density can be from 10 to 50 amperes per $dm^2$. As an example of a suitable electrolyser for use according to the invention can be mentioned the apparatus disclosed in the U.S. Pat. No. 4326941.

The invention will now be described with reference to

FIG. 1 which is a schematic plan of a plant for carrying out the process of the invention.

In FIG. 1, 8 designates a number of parallel electrolysers each comprising a bipolar electrode assembly where the anode consists of a titanium core coated with oxides of metals of the platinum group and the cathode consists of iron plates. Each electrolysis cell works with a current density of about 25 amperes per liter circulating electrolyte and the electrolyte has a temperature of about 70° C. The reaction solution, comprising sodium chlorate and depleted of sodium chloride, is withdrawn at (15) and brought to a salt dissolver (6). Part of the electrolyte flow, about 10%, is withdrawn at (9) and brought to a crystallizer (10). The reaction solution is concentrated here by evaporation whereby sodium chlorate is crystallized and withdrawn via a filter. The mother liquor, which is saturated with regard to sodium chlorate and contains high amounts of sodium chloride, is withdrawn at (11) and re-introduced to the electrolysers via (7). The reaction solution which is depleted of sodium chloride is brought to a salt dissolver (6). Via (5) this is supplied with a crystal slurry having a dry content of about 80 percent by weight for the production of an electrolyte having a content of sodium chloride of 120 grams per liter and 550 grams per liter of sodium chlorate, and here the contents in the mother liquor from the crystallizer have also been considered, which mother liquor is fed to the electrolysers via (7) together with the solution from (6). The total flow in (7) to the electrolysers is 500 $m^3$/h at a production of 4 tons of sodium chlorate per hour.

For the preparation of the sodium chloride slurry technical sodium chloride and water are supplied to a dissolving vessel (1) and an almost saturated sodium chloride solution is brought to a purification step (2), where the salt solution is treated with sodium hydroxide and sodium carbonate for precipitation of hydroxides and carbonates of alkaline earth metals, iron and aluminum. After sedimentation of the precipitation the salt solution is brought to an ion exchange step and contacted with a chelate ion exchanger. The salt solution now has an impurity content of alkaline earth metals below 0.1 ppm and is brought to an evaporator (3). By evaporation the dry content is brought to about 50 percent by weight of crystals and the salt solution is then brought to a mechanical water separator (4), consisting of a screw leading to a filter. This transports the slurry through (5) to the salt dissolver (6). After the filter the dry content is about 80 percent by weight and the mother liquor phases from the salt concentrator and the screw are supplied to a purification step (13). The mother liquor is enriched in sulphate ions and this is here precipitated by addition of calcium or barium in the form of calcium chloride or barium chloride or other soluble calcium or barium salts whereby sulphates are precipitated. The liquid phase is via (14) recirculated to the dissolving vessel (1).

As the sodium chloride is supplied to the electrolyte system can be kept low which above all reduces the load on the crystallizer where otherwise large amounts of water have to be removed from the system. Further, the advantage is gained that the purification steps for the sodium chloride can be carried out before the sodium chloride is brought into contact with the electrolyte. The advantage is that the purification steps can be carried out on substantially smaller liquid quantities and that this liquid quantity contains only the impurities present in the sodium chloride. At previously known processes this purification has been carried out on the entire electrolyte and thus it has both been necessary to take larger flows into consideration and the presence of other chemicals, predominantly sodium chlorate, in the electrolyte which has limited the possibilities of purification. Another advantage of the present process is that sulphates can be removed in a simple manner at the concentration of the sodium chloride solution.

We claim:

1. In the process for the production of an alkali metal chlorate which comprises
   (1) electrolyzing an electrolyte that contains an alkali metal chloride in an electrolysis zone to produce an alkali metal chlorate,
   (2) withdrawing a portion of the depleted electrolyte from said electrolysis zone and separating alkali metal chlorate therefrom, and
   (3) recirculating the depleted electrolyte remaining after said separation step (2) back to said electrolysis zone together with fresh alkali metal chloride, the improvement which comprises the steps of:
   (a) dissolving a solid crude alkali metal chloride in water,
   (b) purifying the solution obtained in step (a),
   (c) concentrating the purified solution of step (b) by evaporation,
   (d) mechanically separating the product of step (c) into a concentrated slurry having a solids content within the range of from 60–95 percent by weight and a mother liquor phase,
   (e) withdrawing said mother liquor phase of step (d) and purifying it to remove sulfate,
   (f) returning the purified mother liquor phase from step (e) to step (a) and
   (g) using said slurry from step (d) as the fresh alkali metal chloride set forth in step (3).

2. In the process for the production of an alkali metal chlorate which comprises
   (A) electrolyzing an electrolyte that contains an alkali metal chloride in an electrolysis zone to produce an alkali metal chlorate,
   (B) withdrawing a portion of the depleted electrolyte from said electrolysis zone and separating alkali metal chlorate therefrom,
   (C) recirculating the depleted electrolyte remaining after said separation step (B) back to said electrolysis zone together with a feed of fresh alkali metal chloride, and
   (D) preparing said feed of fresh alkali metal chloride for step (C) by
      (1) dissolving solid crude alkali metal chloride in water, and
      (2) purifying the alkali metal chloride solution obtained from step (1)
   the improvement which comprises
      (a) concentrating the purified alkali metal chloride solution resulting from step (D) by evaporation of water therefrom,
      (b) mechanically separating the product of step (a) into
         (1) a concentrated alkali metal chloride slurry having an alkali metal chloride solids content within the range of from 60–95% by weight, and
         (2) a mother liquor phase,
      (c) withdrawing said mother liquor phase resulting from step (b)(2) and treating it to remove sulfate therefrom,
      (d) returning the purified mother liquid from step (c) to step (D)(1), and
      (e) using the concentrated alkali metal chloride slurry from step (b)(1) as the feed of fresh alkali metal chloride that is set forth in step (C).

3. A process according to claim 2 characterized in that the alkali metal chlorite solids content of step (b)(1) is within the range of from 70 to 90 percent by weight.

4. A process according to claim 3 characterized in that the recirculated electrolyte with the feed of fresh alkali metal chloride in step C has an alkali metal chloride content within the range of from 50 g/l to 300 g/l.

5. A process according to claim 4 wherein the alkali metal chloride is sodium chloride.

6. A process according to claim 2 characterized in that the evaporation is achieved by means of waste heat in the form of hot water from the process.

7. A process according to claim 6 characterized in that the recirculated electrolyte with the feed of fresh alkali metal chloride in step C has an alkali metal cloride content within the range of from 50 g/l to 300 g/l.

8. A process according to claim 7 wherein the alkali metal chloride is sodium chloride.

9. A process according to claim 6 wherein the alkali metal chloride is sodium chloride.

10. A process according to claim 2 characterized in that the recirculated electrolyte with the feed of fresh alkali metal chloride in step C has an alkali metal chloride content within the range of from 50 g/l to 300 g/l.

11. A process according to claim 10 wherein the alkali metal chloride is sodium chloride.

12. A process according to claim 2 wherein the alkali metal chloride is sodium chloride.

13. A process according to claim 3 wherein the alkali metal chloride is sodium chloride.

* * * * *